US012160717B2

(12) United States Patent
Zhu et al.

(10) Patent No.: US 12,160,717 B2
(45) Date of Patent: Dec. 3, 2024

(54) VIBRATION SOUND DEVICE FOR ELECTRONIC PRODUCT AND ELECTRONIC PRODUCT

(71) Applicant: GOERTEK INC., Shandong (CN)

(72) Inventors: Yueguang Zhu, Shandong (CN); Dongsheng Mao, Shandong (CN); Dezhang Shi, Shandong (CN); Yongqiang Wang, Shandong (CN)

(73) Assignee: GOERTEK INC., Weifang (CN)

( * ) Notice: Subject to any disclaimer, the term of this patent is extended or adjusted under 35 U.S.C. 154(b) by 135 days.

(21) Appl. No.: 17/781,740

(22) PCT Filed: Jun. 30, 2020

(86) PCT No.: PCT/CN2020/099525
§ 371 (c)(1),
(2) Date: Jun. 2, 2022

(87) PCT Pub. No.: WO2021/109559
PCT Pub. Date: Jun. 10, 2021

(65) Prior Publication Data

US 2023/0023530 A1 Jan. 26, 2023

(30) Foreign Application Priority Data

Dec. 2, 2019 (CN) ......................... 201911214860.4

(51) Int. Cl.
*H04R 9/02* (2006.01)

(52) U.S. Cl.
CPC .................................... *H04R 9/025* (2013.01)

(58) Field of Classification Search
CPC ...... H04R 9/025; H04R 1/02; H04R 2499/11; H04R 2400/03; H04R 2499/15
(Continued)

(56) References Cited

U.S. PATENT DOCUMENTS

2013/0308798 A1 11/2013 Chul
2015/0281846 A1* 10/2015 Locke ...................... H04R 1/00 381/412
(Continued)

FOREIGN PATENT DOCUMENTS

CN 101330773 A 12/2008
CN 106655697 A 5/2017
(Continued)

OTHER PUBLICATIONS

International Search Report from International Application No. PCT/CN2020/099525 mailed on Oct. 9, 2020.

*Primary Examiner* — Norman Yu
(74) *Attorney, Agent, or Firm* — Shih IP Law Group, PLLC

(57) ABSTRACT

Disclosed are a vibration sound device for an electronic product and the electronic product. The vibration sound device comprises a first housing, a magnetic assembly, a coil assembly and a second housing. The first housing includes a cavity and is opened at one side thereof. An interaction force is generated between the magnetic assembly in the first housing and the coil assembly on the second housing to drive the vibration sound device to vibrate so as to generate a sound. According to the present disclosure, the magnetic assembly and the coil assembly are configured in a sandwiched structure, so that the overall height of the vibration sound device is reduced, and thus space utilization of the electronic device is improved.

10 Claims, 5 Drawing Sheets

(58) Field of Classification Search
USPC .......................... 381/412, 150, 345, 386, 414
See application file for complete search history.

(56) References Cited

U.S. PATENT DOCUMENTS

2018/0152774 A1* 5/2018 Dong ................... H05K 9/0075
2018/0248457 A1* 8/2018 Shi .......................... F16F 15/08

FOREIGN PATENT DOCUMENTS

CN 107124685 A 9/2017
CN 108966093 A 12/2018
CN 109842701 A 6/2019
CN 110049416 A 7/2019
CN 110113696 A 8/2019
CN 110933566 A 3/2020
CN 210183206 U 3/2020
CN 111050252 A 4/2020
CN 111050253 A 4/2020

* cited by examiner

VIBRATION SOUND DEVICE FOR ELECTRONIC PRODUCT AND ELECTRONIC PRODUCT

TECHNICAL FIELD

The present disclosure relates to a technical field of sound generating device, in particular to a vibration sound device for an electronic product and the electronic product.

BACKGROUND ART

With the advent of 5G Era, while pursuing the ultimate network experience, people's expectations for a truly full screen of electronic devices are also rising. However, how to realize the function of a receiver without an opening on the screen and have a better listening experience is a technical problem currently faced.

At present, in the prior art, the function of receiver realized without an opening on the screen mainly relies on an exciter. The existing exciter generally includes a basin frame, a magnet and a coil, has the advantages of simple structure, easy production and high development prospect and practical value, but the traditional exciter needs to consider the consistency between the resonant frequency of the exciter itself and the resonant frequency of electronic products, resulting in low sensitivity and poor listening experience.

SUMMARY OF THE INVENTION

An object of the present disclosure is to provide a vibration sound device for an electronic product and the electronic product.

According to a first aspect of the present disclosure, there is provided a vibration sound device for an electronic product, including: a first housing, including a cavity and is opened at one side thereof; a magnetic assembly, the magnetic assembly includes a first magnetic assembly and a second magnetic assembly, the first magnetic assembly includes a first magnet and a third magnet, the second magnetic assembly includes a second magnet and a fourth magnet, the first magnetic assembly and the second magnetic assembly are respectively disposed on opposite side walls of the first housing, a magnetization direction of the first magnet and a magnetization direction of the second magnet are the same and along respective arrangement directions thereof, a magnetization direction of the third magnet and a magnetization direction of the fourth magnet are the same and along respective arrangement directions thereof, the magnetization direction of the first magnet is opposite to the magnetization direction of the third magnet, and the first magnet, the second magnet, the third magnet and the fourth magnet constitute a closed magnetic circuit; a first channel formed between the first magnetic assembly and the second magnetic assembly; and a coil assembly and a second housing, the coil assembly is connected with the second housing and positioned in the first channel along a longitudinal direction thereof.

Optionally, the first magnet and the second magnet are oppositely positioned at two sides of a winding wire of the coil assembly; and the third magnet and the fourth magnet are oppositely positioned at two sides of a winding wire of the coil assembly.

Optionally, the first magnet, the second magnet, the third magnet and the fourth magnet of the magnetic assembly are symmetrically positioned with respect to the coil assembly.

Optionally, a distance between the third magnet and the first magnet is greater than a distance between the third magnet or the first magnet and the coil assembly.

Optionally, the magnetization directions of the first magnet and the second magnet are perpendicular to the radial direction of the coil assembly.

Optionally, the first housing is made of a magnetic conductive material.

Optionally, the first housing is made of a non-magnetic conductive material.

Optionally, the vibration sound device further includes a washer, the washer is disposed between the first housing and the magnetic assembly, and the magnetic assemblies on the same side wall of the first housing are connected by the washer.

Optionally, a first through hole is disposed on a side of the first housing away from the second housing, and the first through hole is disposed opposite to the coil assembly.

According to a second aspect of the present disclosure, there is provided an electronic product, including: a first surface and a second surface, the first surface is adapted to vibrate and is connected to the electronic product; and the vibration sound device, wherein the first housing is disposed on the first surface, and the second housing is disposed on the second surface, or, the first housing is disposed on the second surface, and the second housing is disposed on the first surface, and wherein the vibration sound device is configured to drive the first surface to vibrate with respect to the second surface to sound.

Compared with the prior art, the present disclosure has the following technical effect:

The present disclosure discloses a vibration sound device for an electronic product and the electronic product, the vibration sound device includes a first housing, a magnetic assembly, a coil assembly and a second housing; an interaction force is generated between the magnetic assembly in the first housing and the coil assembly on the second housing to drive the vibration sound device to vibrate and sound, accordingly, the overall height of the vibration sound device is reduced, and thus space utilization of the electronic device is improved.

Other features and advantages of the present disclosure will become apparent from the following detailed description of exemplary embodiments of the present disclosure with reference to the accompanying drawings.

BRIEF DESCRIPTION OF THE DRAWINGS

The accompanying drawings, which are incorporated in and constitute a part of the specification, illustrate embodiments of the present disclosure, and serve to explain the principle of the present disclosure together with the description thereof.

REFERENCE SIGNS

100—vibration sound device; 1—first housing; 2—magnetic assembly; 21—first magnet; 22—second magnet; 23—third magnet; 24—fourth magnet; 3—coil assembly; 4—second housing; 5—washer; 6—first through hole; 200—first surface; 300—second surface.

DETAILED DESCRIPTION OF THE EMBODIMENTS

Various exemplary embodiments of the present disclosure will now be described in detail with reference to the accompanying drawings. It should be noted that the relative arrangement of the components and steps, the numerical expressions and numerical values set forth in these embodiments do not limit the scope of the disclosure, unless otherwise specified.

The following description of at least one exemplary embodiment is merely illustrative in fact and is not intended to limit the disclosure, its applications or uses.

Techniques, methods, and apparatus known to those skilled in the relevant art may not be discussed in detail, but where appropriate, such techniques, methods, and apparatus should be considered part of the specification.

In all examples shown and discussed herein, any specific values should be interpreted as merely exemplary and not limiting. Accordingly, other examples of the exemplary embodiment may have different values.

It should be noted that similar numerals and letters represent similar items in the following drawings. Therefore, once an item is defined in a drawing, it does not need to be further discussed in subsequent drawings.

Figure 1:
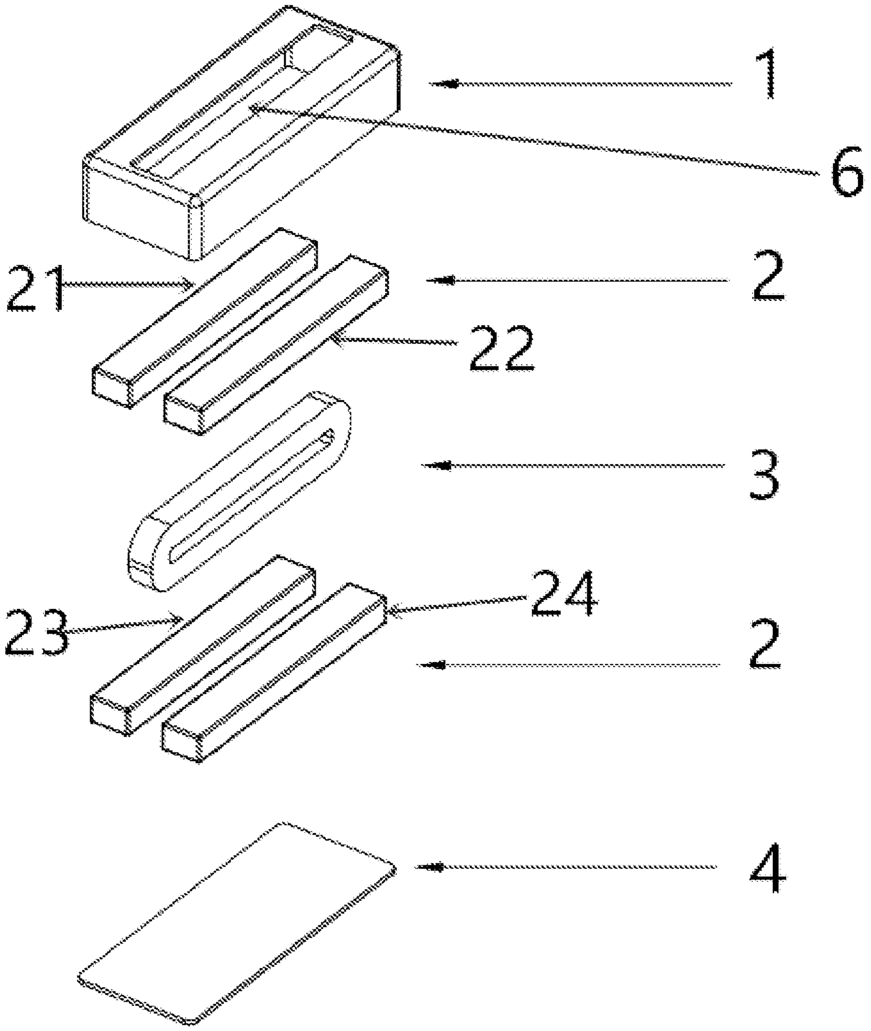
FIG. 1 is an exploded view of a vibration sound device according to the present disclosure.
Figure 2:
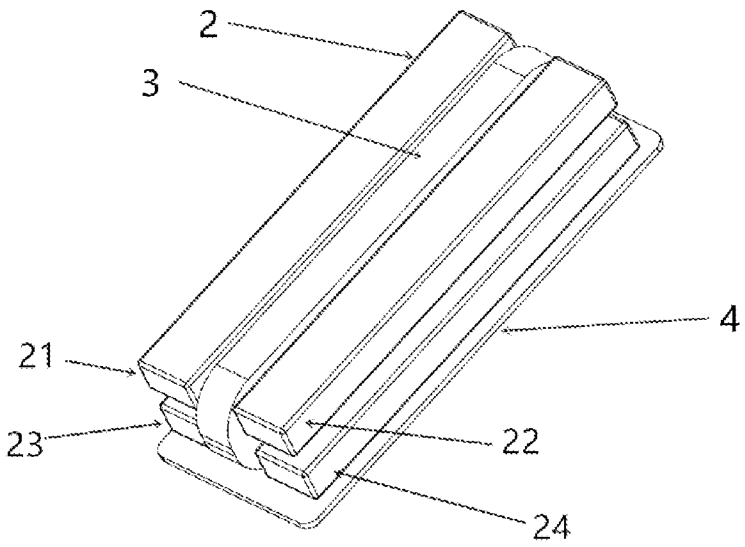
FIG. 2 is a schematic view illustrating a structure of a vibration sound device according to the present disclosure, from which a first housing is removed.
Figure 3:
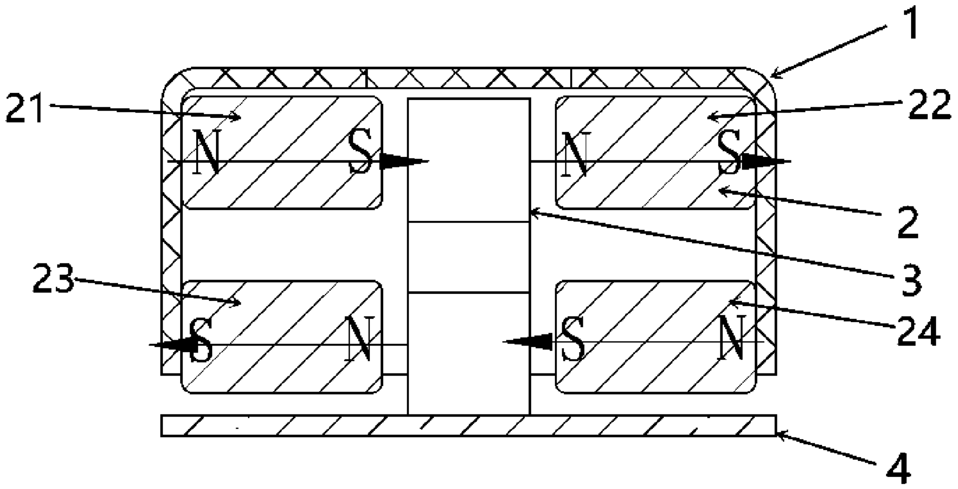
FIG. 3 is a cross-sectional view of a vibration sound device according to the present disclosure.

Referring to FIGS. 1-3, the present disclosure discloses a vibration sound device 100 for an electronic product, including a first housing 1, a magnetic assembly 2, a coil assembly 3 and a second housing 4, and the first housing 1 includes a cavity and is opened at one side thereof. The magnetic assembly 2 includes a first magnetic assembly and a second magnetic assembly, the first magnetic assembly includes a first magnet 21 and a third magnet 23, and the second magnetic assembly includes a second magnet 22 and a fourth magnet 24. The first magnetic assembly and the second magnetic assembly are respectively disposed on opposite side walls of the first housing 1. A magnetization direction of the first magnet 21 and a magnetization direction of the second magnet 22 are the same and along respective arrangement directions thereof, a magnetization direction of the third magnet 23 and a magnetization direction of the fourth magnet 24 are the same and along respective arrangement directions thereof. The magnetization direction of the first magnet 21 is opposite to the magnetization direction of the third magnet 23, and the first magnet 21, the second magnet 22, the third magnet 23 and the fourth magnet 24 constitute a closed magnetic circuit. A first channel is formed between the first magnetic assembly and the second magnetic assembly; and the coil assembly 3 is connected with the second housing 4 and positioned in the first channel along a longitudinal direction thereof.

The magnetization directions of the first magnet 21 and the second magnet 22 are the same and along the arrangement direction thereof. The magnetic lines of the first magnet 21 and the second magnet 22 pass through the coil assembly 3 in the first channel, and thus an interaction force may be generated between the magnetic assembly 2 and the coil assembly 3. Similarly, the magnetization directions of the third magnet 23 and the fourth magnet 24 are the same and along the arrangement direction thereof, and the magnetization direction of the first magnet 21 is opposite to the magnetization direction of the third magnet 23. As such, the first magnet 21, the second magnet 22, the third magnet 23 and the fourth magnet 24 constitute a closed magnetic circuit, so as to drive the electronic product connected to the vibration sound device 100 to sound. In the present disclosure, the magnetic assembly 2 and the coil assembly 3 are configured in a sandwiched structure, so that the overall height of the vibration sound device 100 is reduced, and thus space utilization of the electronic device is improved.

In a specific embodiment, referring to FIG. 3, the first magnet 21 and the second magnet 22 are symmetrically positioned at two sides of the coil assembly 3, and the magnetization directions of the first magnet 21 and the second magnet 22 are horizontal to the right, with N pole on the left and S pole on the right. The third magnet 23 and the fourth magnet 24 are symmetrically positioned at two sides of the coil assembly 3, the magnetization directions of the third magnet 23 and the fourth magnet 24 are toward the left of horizontal direction, with S pole on the left and N pole on the right. When a current is applied to the coil assembly 3, the coil assembly 3 may be subjected to a vertical downward or vertical upward force, and the forced direction is determined according to the current direction of the coil assembly 3, so that a sounding portion of the electronic product is driven to sound by the coil assembly 3. In addition, the magnitude and direction of vibration is changed according to the magnitude and direction of current, and thus the utilization efficiency of magnetic line is high and the power is strong, which provides better sound quality of the electronic product.

In the present disclosure, four magnetic circuits are configured by four magnets, the sizes of all of the four magnets may be the same, all of the four magnets may have a shape of cuboids or cubes, alternatively, the sizes of the four magnets may be different. In an embodiment, for example, the shape of the four magnets may be one cuboid and three cubes. The four magnets are magnetized along their arrangement directions, and the magnetization direction of the third magnet 23 and the fourth magnet 24 is opposite to the magnetization direction of the first magnet 21 and the second magnet 22, so that the four magnetic circuits constitute a closed circuit by further providing a magnetic conductive member, a force between the magnetic assembly 2 and the coil assembly 3 is strong, and the magnetic circuit has a simple structure and thus it may be easily assembled.

In a specific embodiment, the coil assembly 3 may be a radial coil adhered to a surface of the second housing 4, and is positioned in the first channel between the first magnet 21 and the second magnet 22.

Optionally, the first magnet 21 and the second magnet 22 are oppositely positioned at two sides of a winding wire of the coil assembly 3, and the third magnet 23 and the fourth magnet 24 are oppositely positioned at two sides of a winding wire of the coil assembly 3. Accordingly, the closed magnetic circuit composed of the first magnet 21, the second magnet 22, the third magnet 23 and the fourth magnet 24 may completely pass through the winding portion of the coil assembly 3, and thus the force between the coil assembly 3 and the magnetic assembly 2 is increased and the interaction efficiency between the coil assembly 3 and the magnetic assembly 2 is improved.

Optionally, the first magnet 21, the second magnet 22, the third magnet 23 and the fourth magnet 24 of the magnetic assembly 2 are symmetrically positioned with respect to the coil assembly 3. Specifically, the first magnet 21 and the third magnet 23 are positioned symmetrically with the second magnet 22 and the fourth magnet 24 with respect to a longitudinal direction the coil assembly 3, and the first magnet 21 and the second magnet 22 are positioned symmetrically with the third magnet 23 and the fourth magnet 24 with respect to a latitudinal direction of the coil assembly 3, so that two rod-like magnets are positioned symmetrically in an up-down direction and two rod-like magnets are positioned symmetrically in left-right direction. Thereby the magnet e magnetic lines are perpendicular to the coil assembly 3 and are in a symmetrical state, the utilization rate of the magnetic line is high, and the force between the magnetic assembly 2 and the coil assembly 3 is stronger.

Figure 4:
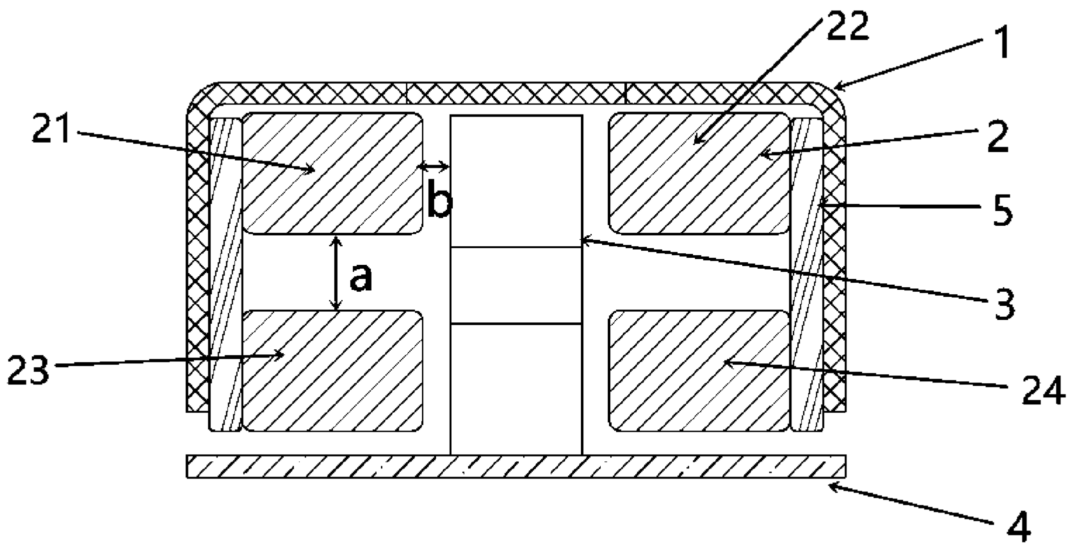
FIG. 4 is a cross-sectional view of a vibration sound device according to another embodiment of the present disclosure.

Optionally, referring to FIG. 4, a distance a between the third magnet 23 and the first magnet 21 is greater than a distance b between the third magnet 23 or the first magnet 21 and the coil assembly 3. As for the closed magnetic circuit composed of the first magnet 21 and the second magnet 22, the third magnet 23 and the fourth magnet 24, in case where a is greater than b, taking the first magnet 21 as an example, the force between the first magnet 21 and the coil assembly 3 is greater than the force between the first magnet 21 and the third magnet 23, and the magnetic lines generated by the first magnet 21 are easier to pass through the coil assembly 3 and a strong interaction force is generate between the first magnet 21 and the coil assembly 3, and the integrity and stability of the magnetic circuit may be ensured.

Optionally, the magnetization directions of the first magnet 21 and the second magnet 22 are perpendicular to the radial direction of the coil assembly 3. The first magnet 21 and the second magnet 22 are positioned at two sides of the coil assembly 3 and their magnetization directions are the same, so that the magnetic lines generated by the first magnet 21 and the second magnet 22 may pass through the coil assembly 3. In an embodiment, when the first magnet 21 and the second magnet 22 are located at upper portion and lower portion and one is above another, the magnetic lines of the first magnet 21 and the second magnet 22 may pass through the coil assembly 3 along the arrangement direction. In this case, the magnetic lines of the first magnet 21 and the second magnet 22 intersect with the coil assembly 3 but not perpendicular thereto, such that the utilization rate of the magnetic lines may be decreased. When the first magnet 21 and the second magnet 22 are located on the same horizontal plane, i.e., the magnetization direction of the first magnet 21 and the second magnet 22 is perpendicular to the radial direction of the coil assembly 3 along their arrangement direction. In this case, the magnetic lines of the first magnet 21 and the second magnet 22 may perpendicularly pass through the coil assembly 3, magnetic interaction between the magnetic assembly 2 and the coil assembly 3 may be more effective.

Optionally, the first housing 1 is made of a magnetic conductive material or a non-magnetic conductive material. In a specific embodiment, the first housing 1 is made of a magnetic conductive material, a magnetic conductive member may be disposed to connect the magnetic assemblies 2 on the same side to constitute a completed magnetic circuit together with the coil assembly 3 at the central position.

In another specific embodiment, the first housing 1 is made of a non-magnetic conductive material, the vibration sound device 100 further includes a washer 5, the washer 5 is disposed between the first housing 1 and the magnetic assembly 2, and the magnetic assemblies 2 on the same side wall of the first housing 1 are connected by the washer 5. The connection between the magnetic assemblies 2 on the same side through the washer 5 may avoid the entire first housing 1 being a magnetic conductive member, avoid the first housing 1 from enclosing the vibration sound device 100, so that the magnetic circuit is not disturbed by other magnetic conductive members, and thus the stability of the magnetic circuit may be improved.

Optionally, a first through hole 6 is disposed on a side of the first housing 1 away from the second housing 4, and the first through hole 6 is disposed opposite to the coil assembly 3. While the magnetic assembly 2 and the coil assembly 3 are configured in a sandwiched structure, which is accommodated in the first housing 1, a sufficient magnetic gap between the magnetic assembly 2 and the coil assembly 3 should be ensured, the first through hole 6 may be disposed so as to check the magnetic gap between the magnetic assembly 2 and the coil assembly 3 and a problem due to the gap can be recognized and adjusted in time, which improves the efficiency and service life of the vibration sound device 100.

Figure 5:
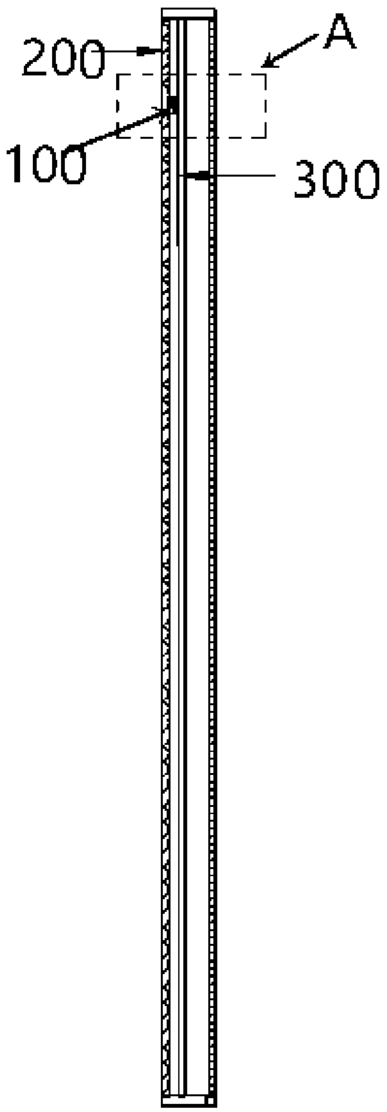
FIG. 5 is a schematic view illustrating a vibration sound device applied to an electronic product according to the present disclosure.

Referring to FIG. 5, the present disclosure also discloses an electronic product, including: a first surface 200 and a second surface 300, the first surface 200 is adapted to vibrate and is connected to the electronic product; and the vibration sound device 100. The first housing 1 of the vibration sound device 100 is disposed on the first surface 200, and the second housing 4 of the vibration sound device 100 is disposed on the second surface 300. Or, the first housing 1 of the vibration sound device 100 is disposed on the second surface 300, and the second housing 4 of the vibration sound device 100 is disposed on the first surface 200. The vibration sound device 100 is configured to drive the first surface 200 to vibrate with respect to the second surface 300 to sound, so that the electronic product with good sound quality may be ensured.

Specifically, the first housing 1 may be adhered to a surface of the first surface 200, or embedded inside the first surface 200, as long as a sufficient connection strength can be ensured.

Specifically, the first surface 200 may be a screen of the electronic product, and the second surface 300 may be a middle frame or a PCB board of the electronic product.

Optionally, the electronic product includes one of a mobile phone, a tablet computer, an e-book reader, an MP3 player, an MP4 player, a computer, a set-top box, a smart TV, and a wearable device.

Figure 6:
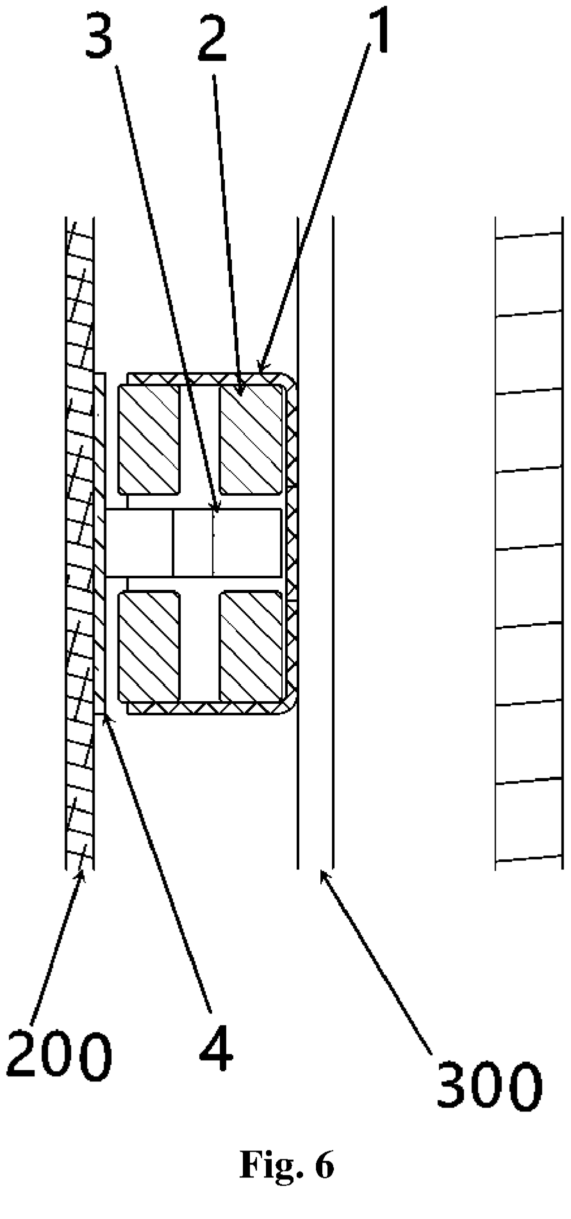
FIG. 6 is an enlarged view of A portion in FIG. 5 according to the present disclosure.

Referring to FIG. 6, in an embodiment of the present disclosure, the vibration sound device 100 is applied to an electronic product, wherein the first housing 1 of the vibration sound device 100 is disposed on the second surface 300, the second housing 4 of the vibration sound device 100 is disposed on the first surface 200, a strong interaction force is generated between the magnetic assembly 2 in the first housing 1 and the coil assembly 3 in the second housing 4, and directly drives the first surface 200 to vibrate and sound through the second housing 4.

Although some specific embodiments of the present disclosure have been described in detail by way of examples, those skilled in the art should understand that the above examples are provided for illustration only and are not intended to limit the scope of the present disclosure. Those skilled in the art will appreciate that modifications may be made to the above embodiments without departing from the scope and spirit of the present disclosure. The scope of the present disclosure is defined by the appended claims.

What is claimed is:

1. A vibration sound device for an electronic product, comprising:

a first housing, including a cavity and is opened at one side thereof;

a magnetic assembly, the magnetic assembly comprises a first magnetic assembly and a second magnetic assembly, the first magnetic assembly comprises a first magnet and a third magnet, the second magnetic assembly comprises a second magnet and a fourth magnet, the first magnetic assembly and the second magnetic assembly are respectively disposed on opposite side walls of the first housing, a magnetization direction of the first magnet and a magnetization direction of the second magnet are the same and along respective arrangement directions thereof, a magnetization direction of the third magnet and a magnetization direction of the fourth magnet are the same and along respective arrangement directions thereof, the magnetization direction of the first magnet is opposite to the magnetization direction of the third magnet, and the first magnet, the second magnet, the third magnet and the fourth magnet constitute a closed magnetic circuit;

a first channel formed between the first magnetic assembly and the second magnetic assembly; and a coil assembly and a second housing, the coil assembly is connected with the second housing and positioned in the first channel such that a coil plane thereof is located between the first magnetic assembly and the second magnetic assembly facing each other, wherein the second housing is driven to vibrate with respect to the first housing by an interaction force between the magnetic assembly and the coil assembly.

2. The vibration sound device of claim 1, wherein the first magnet and the second magnet are oppositely positioned at two sides of a winding wire of the coil assembly, and wherein the third magnet and the fourth magnet are oppositely positioned at two sides of the winding wire of the coil assembly.

3. The vibration sound device of claim 1, wherein the first magnet, the second magnet, the third magnet and the fourth magnet of the magnetic assembly are symmetrically positioned with respect to the coil assembly.

4. The vibration sound device of claim 1, wherein a distance between the third magnet and the first magnet is greater than a distance between the third magnet or the first magnet and the coil assembly.

5. The vibration sound device of claim 1, wherein the magnetization directions of the first magnet and the second magnet are perpendicular to a radial direction of the coil assembly.

6. The vibration sound device of claim 1, wherein the first housing is made of a magnetic conductive material.

7. The vibration sound device of claim 1, wherein the first housing is made of a non-magnetic conductive material.

8. The vibration sound device of claim 7, wherein the vibration sound device further comprises a washer, the washer is disposed between the first housing and the magnetic assembly, and the magnetic assemblies on the same side wall of the first housing are connected by the washer.

9. The vibration sound device of claim 1, wherein a first through hole is disposed on a side of the first housing away from the second housing, and the first through hole is disposed opposite to the coil assembly.

10. An electronic product, comprising:

a first surface and a second surface, wherein the first surface is adapted to vibrate and is connected to the electronic product; and the vibration sound device of claim 1, wherein the first housing is disposed on the first surface, and the second housing is disposed on the second surface, or, the first housing is disposed on the second surface, and the second housing is disposed on the first surface, and wherein the vibration sound device is configured to drive the first surface to vibrate with respect to the second surface to sound.

* * * * *